United States Patent

[11] 3,573,507

[72] Inventor Hung L. D. Eng
Ottawa, Ontario, Canada
[21] Appl. No. 774,241
[22] Filed Nov. 8, 1968
[45] Patented Apr. 6, 1971
[73] Assignee Northern Electric Company Limited
Montreal, Quebec, Canada
[32] Priority Sept. 11, 1968
[33] Canada
[31] 029,748

[54] INTEGRATED MOS TRANSISTOR FLIP-FLOP CIRCUIT
5 Claims, 13 Drawing Figs.

[52] U.S. Cl. ........ 307/279
[51] Int. Cl. ........ H03k 3/286
[50] Field of Search ........ 307/205, 251, 279, 304

[56] References Cited
UNITED STATES PATENTS

| | | | |
|---|---|---|---|
| 3,363,115 | 1/1968 | Stephenson et al. | 307/279 |
| 3,395,292 | 7/1968 | Bogert | 307/304X |
| 3,431,433 | 4/1969 | Ball et al. | 307/251X |
| 3,483,400 | 12/1969 | Washizuka et al. | 307/279 |

*Primary Examiner*—John S. Heyman
*Attorneys*—Peter Kirby and Charles P. Curphey

ABSTRACT: A circuit capable of *J–K* operation and composed of enhancement-type MOS transistors adapted for integrated circuits. The total gate area required for the transistors is reduced by minimization of series connection of two or more of the inverter transistors, which are required to have a low resistance compared with the transistors that perform a load resistor function.

This avoidance of series connection is achieved by connecting one of the cross-connected feedback paths of each flip-flop assembly through a transmission transistor gated by the clock pulses.

INVENTOR:
HUNG L. D. ENG
BY: Craig & Antonelli
ATTORNEYS

INVENTOR:
HUNG L. D. ENG
BY: Craig & Antonelli
ATTORNEYS

INVENTOR:

HUNG L. D. ENG

BY: Craig & Antonelli

ATTORNEYS

INVENTOR:

HUNG L. D. ENG

BY Craig & Antonelli

ATTORNEYS

INVENTOR:

HUNG L. D. ENG

BY: Craig & Antonelli

ATTORNEYS

INTEGRATED MOS TRANSISTOR FLIP-FLOP CIRCUIT

This invention relates to integrated binary flip-flop circuits capable of operating with so-called *J–K* flip-flop capability.

In logic terms, a flip-flop may be capable of satisfying any one of the modes set out in the following Truth Table:

| | J | K | $Q_{n+1}$ |
|---|---|---|---|
| Mode (a) | 0 | 0 | Qn |
| Mode (b) | 1 | 0 | 1 |
| Mode (c) | 0 | 1 | 0 |
| Mode (d) | 1 | 1 | $\overline{Qn}$ |

where $Q_{n+1}$ represents the state of the output after $n+1$ complete clock pulses;

*Qn* represents the state of the output after *n* complete clock pulses;

$\overline{Qn}$ is the reverse of *Qn*.

A so-called R–S flip-flop can provide logic modes *a*, *b* and *c*, but is ambiguous in mode *d*. It is the ability to provide logic mode *d* that distinguishes a *J–K* flip-flop. However, since there may be occasions when only mode *d* is required, and since for such circumstances there would be no purpose in constructing a circuit having the added complications attendant upon the need to furnish modes *a*, *b* and *c* also, a *J–K* flip-flop, as that term is used in the present specification including the claims, is defined as a flip-flop that will function at least in mode *d*. As will be seen from the specific description that follows, two examples of *J–K* flip-flop circuits according to the invention are described in detail: one of these circuits effectively has the inputs *J* and *K* both permanently fixed at level 1, and it consequently provides only mode *d;* while the other circuit provides for operation in each of the four modes and thus has both the R–S and the *J–K* capabilities i.e. all four modes simultaneously.

An object of the present invention is to provide a *J–K* flip-flop that is well adapted to the use of MOS transistors for use in integrated circuit form, and especially in large scale integration.

A MOS transistor (also referred to as Metal Oxide Semiconductor Field Effect Transistor, abbreviated MOSFET or MOS transistor), differs from a bipolar transistor in some essential respects, particularly in the manner of manufacture which allows simple forming of integrated circuits comprising either a number of MOS transistors alone or in combination with other circuit elements. As to operation, one of the major distinctions of a MOS transistor from other control switching elements resides in the fact that the controlling electrode, called the "gate," is galvanically isolated from the controlled current electrodes called the "source" and the "drain." A further special feature of the enhancement-type MOS transistor resides in the presence of a so-called "threshold" which is predetermined voltage between gate and source of the element, at which voltage an abrupt change in the resistance of the current path, i.e. between source and drain, takes place.

In particular, it is an object of the invention to provide a *J–K* flip-flop formed of enhancement-type MOS transistors and having a smaller total active gate area than it has been found necessary to use in prior circuits designed for the same function. A smaller total gate area leads to a higher yield during manufacture, because the thin layer of gate oxide (1300±100 A. thick) is very critical and hard to control and hence accounts for the majority of rejects. The yield (percentage of circuits manufactured that pass the necessary acceptance tests) depends mainly on the total gate area per circuit, and consequently any reduction of this parameter represents a significant advantage in terms of improved yield.

Not only does reduction of the total gate area increase the yield, but it also enhances the operating speed of the circuit by reduction of capacitance in the circuit. Moreover it tends to increase the fan-out capability of an assembly of such circuits for the same reason, the fan-out capability of a circuit being its ability to feed reliably to a relatively large number of inputs of succeeding stages. With lower active gate areas each stage will present a lower capacitive load to a preceding stage, with the result that a larger number of succeeding stages can be connected to the output of a preceding stage for the same capacitive load.

Another and purely physical advantage of a reduced total gate area is a general reduction in the overall space required by the circuit on the chip and a consequent increase in the number of circuits that can be formed on a chip of given size.

A further object of the invention is to provide a circuit that, as well as meeting the above requirements for a reduced gate area, is not dependent upon a high clock frequency to take care of leakages and such; but is capable of operating reliably at very low frequencies, i.e. down to DC.

The features of the invention that afford these advantages are described below both broadly, and specifically in connection with the preferred embodiments of the invention that are illustrated in the drawings.

DESCRIPTION OF DRAWINGS

Two examples of prior art circuits and two circuits embodying the invention are illustrated by way of example in the accompanying drawings, the prior art circuits being shown to provide the necessary comparison between their total gate areas and that of the circuits according to the invention, and hence to demonstrate the advantage of the latter. In the drawings.

FIRST PRIOR ART CIRCUIT (FIG. 1)

Figures 1, 2:
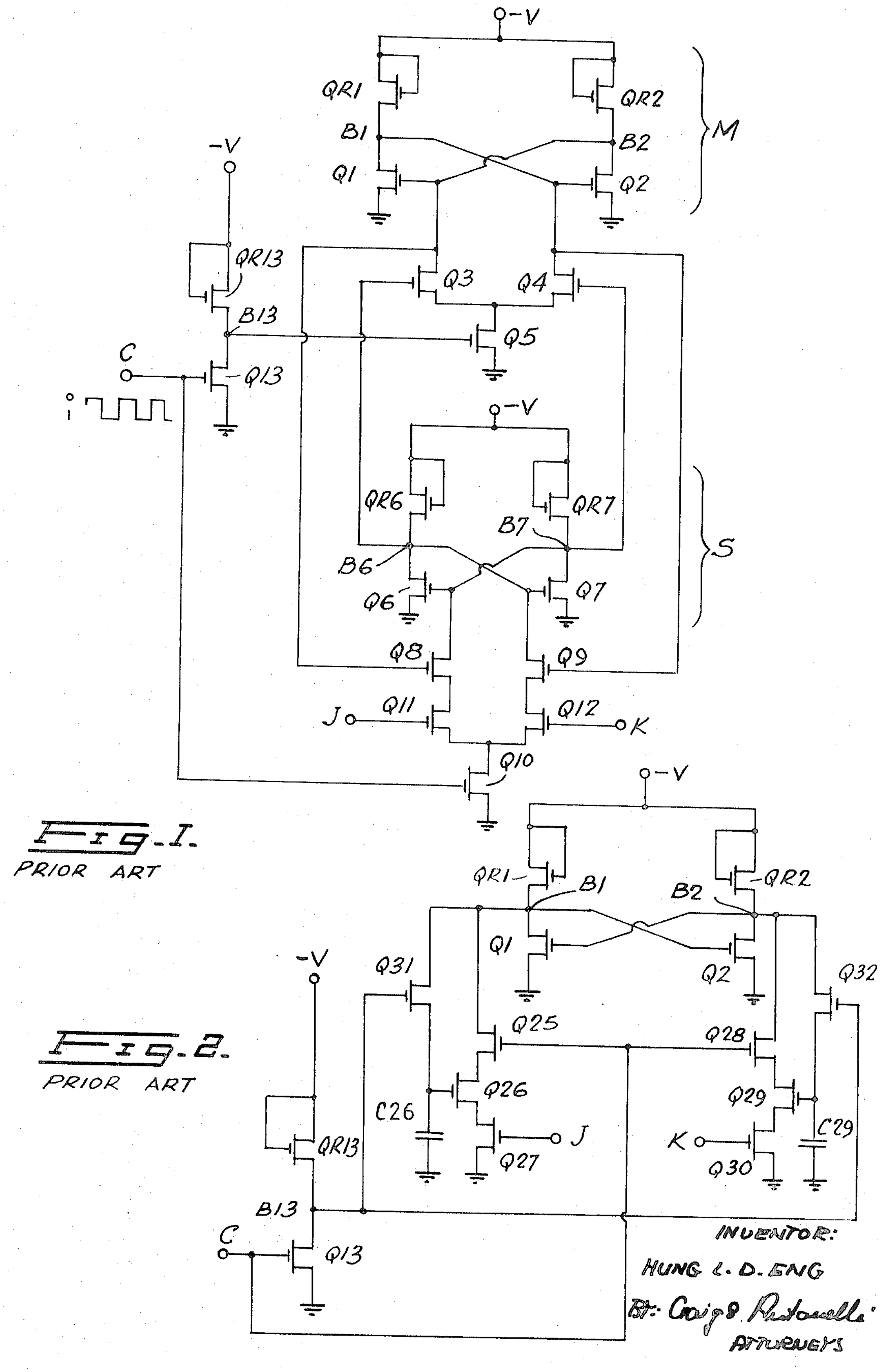
FIG. 1. PRIOR ART, FIG. 2. PRIOR ART
FIG. 1 is a first, prior art, *J–K* flip-flop integrated circuit using MOS transistors.
FIG. 2 is a second such prior art circuit.

Assume that $-V$ is typically $-20$ volts. The threshold voltage of each enhancement type MOS transistor will be about $-4$ volts, and each transistor will be capable of an ON (conducting) and an OFF (nonconducting) condition. These transistors must, of course, both be of the same channel type, i.e. given the polarity of the present circuit, they will be P-channel enhancement-type transistors. Further take logic O level as approximately equal to 0 volts, and logic 1 level as approximately equal to $-15$ volts. Clock pulses alternating uniformly between 0 level and 1 level will be received at terminal C.

Transistors Q13 and QR13 represent a typical pair of enhancement-type MOS transistors used in this type of circuit. The transistor Q13 acts as an inverter and the transistor QR13 as a resistor. When the gate of transistor Q13 is at 1 level, the transistor is ON. The common point B13 is thus nearly at ground potential, i.e. level 0, the transistor QR13 acting as a load resistor and being designed to have a resistance between its source and drain many times that of the transistor Q13. This resistance ratio could typically be chosen somewhere in the range of amount 16 to 1 to about 9 to 1, as will be more fully discussed below in connection with FIG. 4. Conversely, when the gate of transistor Q13 is at 0 level, the transistor is OFF, and point B13 rises to 1 level. Such an inverter action is typical of all the other MOS transistors in the circuit portions not yet described and in which the gate is electrically independent of the other two electrodes, these inverter transistors being designated by the symbol Q and a numeral. The load resistor action of transistor QR13, on the other hand, is typical of all the other MOS transistors not yet described in which the gate is tied to a current electrode. These are designated throughout by the symbols QR and the same distinguishing numeral as that of the companion inverter transistor.

The master flip-flop M consists of two such pairs of MOS transistors, Q1, QR1 and Q2, QR2 with their intermediate points B1 and B2 cross-connected to the gates of transistors Q2 and Q1 in the usual flip-flop manner. These gates are also connected through respective transistors Q3 and Q4, and in common through transistor Q5, to ground. The gate of transistor Q5 is connected to point B13 and the gates of transistors Q3 and Q4 to intermediate points B6 and B7 of a slave flip-flop S comprising transistor Q6, QR6 and Q7 and QR7. Points B7 and B6 are similarly cross-connected to the gates of transistors Q6 and Q7, and through respective transistors Q8 and Q9 and in common through transistor Q10 to ground. The gates of transistors Q8 and Q9 are connected back to points B2 and B1 of the master flip-flop M, and the gate of transistor Q10 to the clock terminal C.

Additionally, a pair of transistors Q11 and Q12 have been included in series respectively with transistors Q8 and Q9, their gates being connected to control terminals *J* and *K*. In the case where the *J–K* flip-flop is required to operate only in mode *d* as defined above, i.e. with *J* and *K* continuously at logic level 1, the transistors Q11 and Q12 can be omitted, with the transistors Q8 and Q9 connected directly to transistor Q10, since this will have the same effect as applying level 1 to the gates of transistors Q11, Q12.

In operation, assume point B1 at 0 and point B2 at 1. The master flip-flop M is stable. Further assume point B13 at 1 causing transistor Q5 to be ON. Transistor Q4 will also be ON to complete the ground connection to point B1 to hold it at O. Transistor Q4 ON calls for point B7 being at 1 and hence point B6 at 0. Ground connection to points B6 and B7 is interrupted at transistor Q10, since the clock pulse at terminal C must be 0 with point B13 at 1.

Assuming the terminals *J* and *K* are both at 1 so that transistors Q11 and Q12 are both ON, when the clock pulse changes to 1 to switch on transistor Q10, a ground connection is established through transistor Q8 (its gate being at 1) to change point B7 over to 0, at the same time switching off transistor Q6 so that point B6 rises to 1 to reopen transistor Q7 and hold the slave flip-flop S stable in its new state. Point B6 rising to 1 also turns on transistor Q3, but transistor Q5 is OFF at this time, since point B13 is at 0. However on occurrence of the second half of the clock cycle, point B13 goes to 1 again, to establish a ground connection to point B2 to reverse it to 0, and at the same time switch off transistor Q1 and allow point B1 to rise to 1, thus reversing the state of the master flip-flop M. Outputs can be taken from any one of points B1, B2, B6 and B7 depending on the phase required.

SECOND PRIOR ART CIRCUIT (FIG. 2)

Clock terminal C and transistors Q13 and QR13 function as before. The flip-flop also consists of transistors Q1, QR1, Q2 and QR2 cross-connected, as before.

Points B1 and B2 are each connected to a string of three transistors Q25, Q26, Q27 and Q28, Q29, Q30 respectively. Transistors Q27 and Q30 have their gates connected to the *J* and *K* terminals and may therefore be omitted if only mode *d* is required. For the present description, assume these latter transistors either omitted or permanently switched ON. The gates of transistors Q25 and Q28 are commonly connected to clock terminal C. The points B1 and B2 are also respectively connected each through a transistor Q31, Q32 to the gate of transistor Q26 or Q29, the gates of transistors Q31 and Q32 being commonly connected to point B13. In this circuit use is made of the input gate capacitance of transistors Q26 and Q29, these capacitances having been shown at C26 and C29, although, in reality, they are not separate circuit elements. This gate capacitance may be only about 1 picofarad, but due to the extremely low gate leakage, the associated time constant may still be long relative to the clock pulse transition times.

Assume point B1 at level 1 and thus point B2 at 0. Also assume terminal C at 0, so that transistors Q25 and Q28 are OFF, point B13 is at 1, and transistors Q31 and Q32 are ON. The logic level 1 at point B1 is now stored in capacitance C26.

When the clock pulse changes over, point B13 goes to 0, switching off transistor Q31, but the 1 level stored in the capacitance C26 acts to hold the transistor Q26 ON, so that the switching on of transistor Q25 by the 1 level at terminal C connects point B1 to ground to change it to 0 and reverse the flip-flop. During the next half cycle of the clock pulse, the transistor Q32 is switched ON to store the 1 level now at point B2 in the capacitance C29 in readiness for similar action to reverse the state of the flip-flop on occurrence of the next reversal of the clock pulse.

Figures 3, 3A:
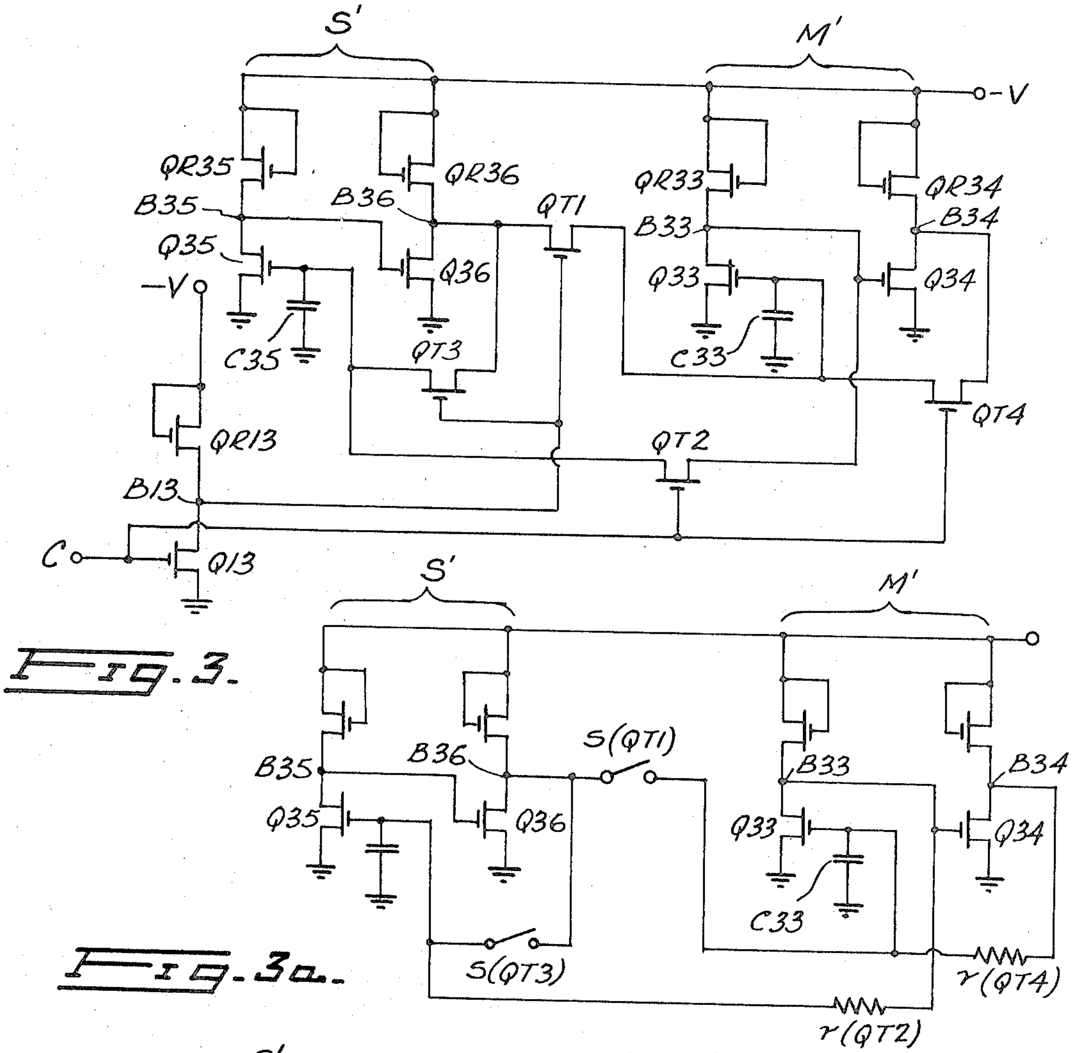
FIG. 3 is a first example of a *J–K* flip-flop according to the invention.
FIG. 3*a* is a partial equivalent circuit of FIG. 3 demonstrating a first circuit condition.
Figure 3B:
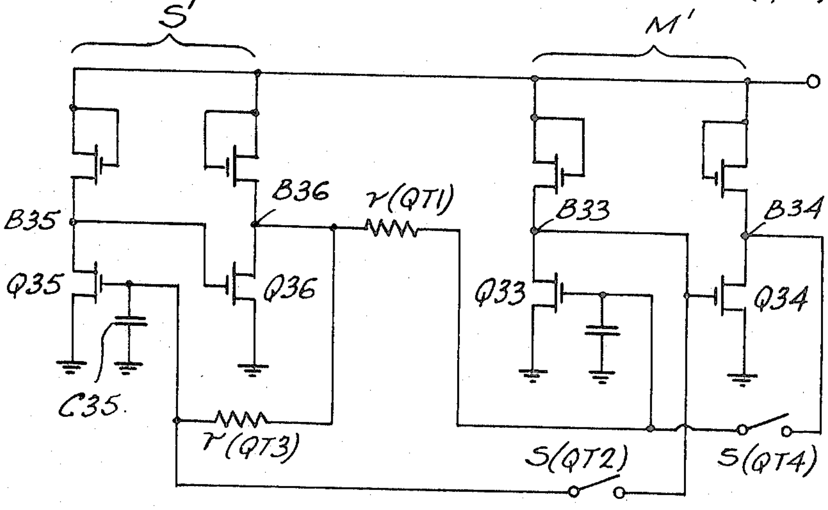
FIG. 3*b* is a partial equivalent circuit of FIG. 3 demonstrating a second circuit condition.

FIRST CIRCUIT ACCORDING TO THE INVENTION (FIGS. 3, 3*a* and 3*b*)

This circuit consists of a master flip-flop stage M′ made up of transistor pairs Q33, QR33 and Q34, QR34; and a slave flip-flop stage S′ made up of transistor pairs Q35, QR35 and Q36, QR36. However, instead of direct cross-coupling, each flip-flop uses direct coupling of one feedback path (point B33 to the gate of transistor Q34, and point B35 to the gate of transistor Q36) and a bidirectional transmission in the other feedback path (i.e. a MOS transistor QT3 between point B36 and the gate of transistor Q35, and a MOS transistor QT4 between point B34 and the gate of transistor Q33). In addition the circuit has two further bidirectional transmission transistors in the form of MOS transistors QT1 and QT2 between the two flip-flops, the transistors QT1 being located between point B36 and the gate of transistor Q33, while transistor QT2 is located between point B33 and the gate of transistor Q35. This circuit also makes use of the capacitance feature of FIG. 2, as represented by the gate capacitances C33 and C35 of the respective transistors Q33 and Q35. As before, these are not separate components, in reality. The clock pulse circuit Q13 and QR13 is the same as before. The gates of transmission transistors QT3 and QT1 are commonly connected to point B13, while those of transmission transistors QT4 and QT2 are commonly connected to terminal C.

FIG. 3*a* shows diagrammatically the circuit condition when terminal C is at 1 and transistors QT4 and QT5 are ON, such transistors being also represented diagrammatically by resistors *r*, the resistance of which is very low compared to that of the transmission transistors that are switched OFF. Transistors QT3 and QT1 are OFF and are thus also diagrammatically represented by open switches *s*. FIG. 3*b* shows the reverse state of affairs, with *r* representing transistors QT3 and QT1 and *s* representing transistors QT4 and QT2.

Assume that points B34 and B36 are at logic level 1 and point B33 and B35 at a level 0, just before the flip-flop is switched by the clock signal to the condition represented in FIG. 3*a*. The instant when the clock pulse at terminal C switches from logic 0 to logic 1, referring to FIG. 3*a:*

1. Transistor QT1 turns OFF to isolate the slave flip-flop S′ from the master flip-flop M′;
2. Transistor QT4 turns ON to complete the cross-coupling of the master flip-flop M′ to ensure its stability regardless of the length of the clock pulse;

3. Transistor QT3 turns OFF isolating point B36 from the gate of transistor Q35, so that the gate of transistor Q35 can acquire the new level from point B33 through transistor QT2 which is turned ON.

The logic 0 level at point B33 acts on the gate of transistor Q35 turning point B35 to logic 1 level and point B36 to logic 0 level. The state of the slave flip-flop S′ is thus changed. Upon change to the condition shown in FIG. 3*b* this new information stored in the slave flip-flop S′ is transferred to the master flip-flop M′, in a manner analogous to that just described, the transmission gates reversing their roles to provide proper latching action and isolation.

Figure 4:
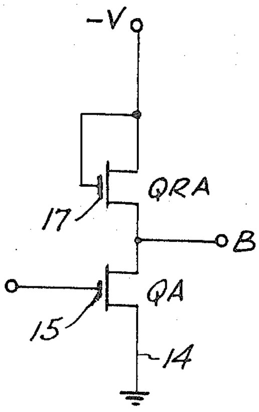
FIG. 4 shows a fragmentary circuit comprising a pair of series connected MOS transistors arranged as typically used in the circuits of FIGS. 1 to 3.
Figure 5:
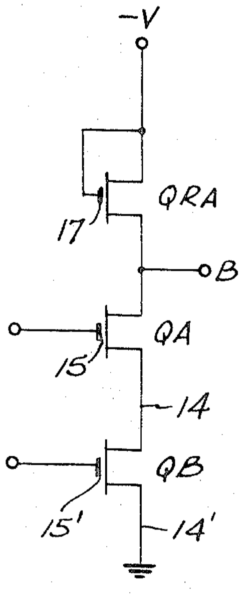
FIG. 5 shows a fragmentary circuit of three MOS transistors also as used in series connection in the circuits of FIGS. 1 and 2.
Figure 5A:
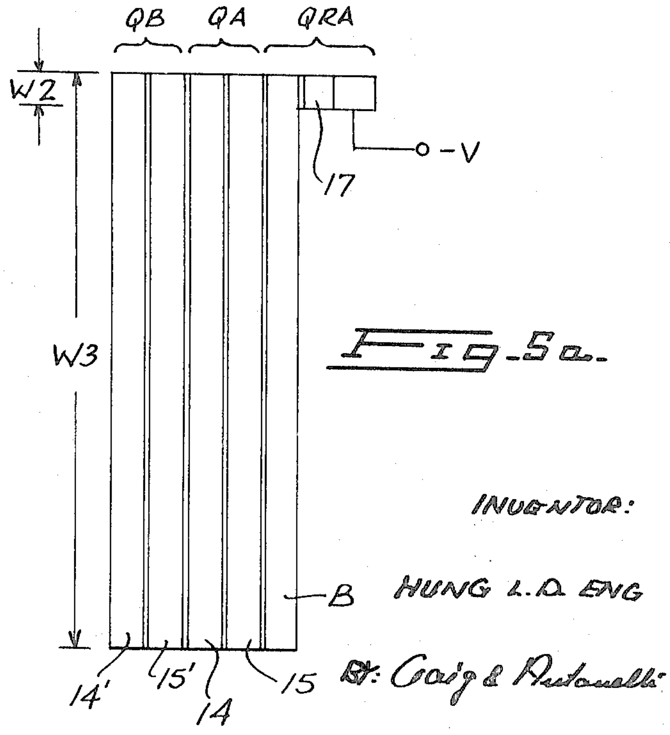
FIG. 5*a* is a diagrammatic plan view of the physical structure of the circuit of FIG. 5.

STRUCTURAL CONSIDERATIONS (FIGS. 4 to 5*a*)

Figure 4A:
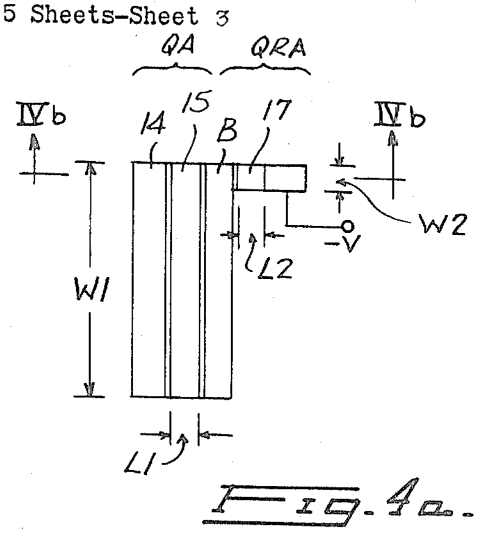
FIG. 4*a* is a diagrammatic plan view of the physical structure of the circuit of FIG. 4, as it will appear in an integrated circuit.
Figure 4B:
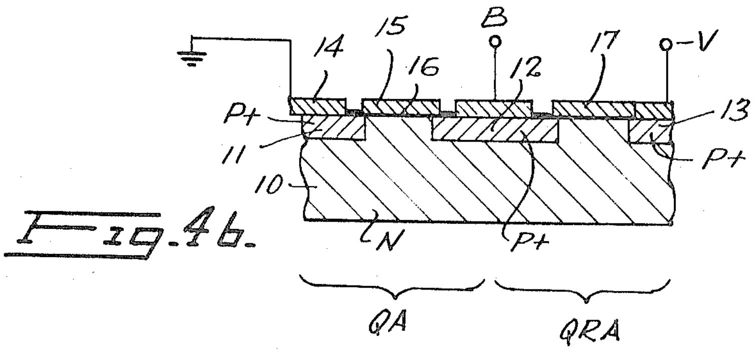
FIG. 4*b* is a section on IV*b*–IV*b* in FIG. 4*a* on an enlarged scale.

FIGS. 4*a* and 4*b* show a portion of an integrated circuit in which there are formed a typical pair of MOS transistors as used in series in the foregoing circuits, a typical, low resistance, inverter transistor QA (FIG. 4) coupled to a typical, higher resistance, load transistor QRA. These structures are formed, for example, on an N substrate 10 (FIG. 4*b*) by means of three diffused P+ regions 11, 12 and 13. The region 11 forms one current electrode of the transistor QA, connected to ground through an ohmic contact 14; the region 12 forms the interconnected current electrodes of the two transistors, and is connected to common contact B; regions 11 and 12 are bridged by a gate 15 which is insulated from the electrodes by an oxide layer 16; and the region 13 forms the other current electrode of the transistor QRA and is connected both to the source of voltage $-V$ and the gate 17 of this transistor.

In FIG. 4*a* the length of the gate 15, that is the dimension $L1$ in the direction of current flow, is assumed to be one unit. The length of the gate 17, $L2$, is also equal to one unit. However, the width $W1$ of the gate 15 is shown as equal to nine units, whereas the width $W2$ of the gate 17 is only one unit. Since enhancement-type MOS transistors conduct by means of an induced depletion layer formed in the substrate beneath the gate and between the current electrode regions, the conductance of a given such layer will vary inversely proportionately with its length and thus with the length of the gate and directly proportionately with its width and thus with the gate width. In other words, assuming for simplicity $L1=L2$, the ratio of $W1$ to $W2$ of 9 to 1 will have the effect of giving the transistor QA a conductance ratio $Z$ relative to the transistor QRA of nine. This is in accordance with the requirement that the load transistor QRA should have substantially more resistance than the inverter transistor QA, e.g. nine times, in order to ensure, when they are both switched on, that by far the major portion of the voltage drop occurs across the load transistor. In the circuits above described this ensures that the intermediate point B nearly reaches ground voltage and is clearly at the 0 level. In the design of integrated digital circuits, an important consideration is to keep this log 0 level of every inverter stage always lower than the threshold voltage, so that the following stage is sure to be held OFF with an adequate noise margin. In practice, the most economical use of space on the chip for a given design value of the conductance ratio $Z$ may involve reducing the ratio of $W1$ to $W2$ and increasing the ration of $L2$ to $L1$, but the present example in which $L1$ equals $L2$ is simpler and fully explains the principle.

When two inverter transistors QA and QB are arranged in series with a load transistor QRA, as shown in FIG. 5, it is necessary for the two transistors QA and QB together to have the same conductance that the transistor QA alone had in the FIG. 4 circuit. This requires each of their gates 15, 15′ to have a width $W3$ equal to 18 units, as shown in FIG. 5*a*. In other words, each inverter transistor has to have a gate with twice the area of the inverter transistor used in the FIG. 4 circuit. It follows that the total gate area can be reduced by avoidance of the series connection of two inverter transistors that FIG. 5 shows, and an increased reliance on the type of arrangement shown in FIG. 4, in which only a single inverter transistor is series coupled to a load transistor. Contact 14′ of transistor QB corresponds to contact 14 of transistor QA.

COMPARISON OF FIG. 3 CIRCUIT WITH THOSE OF FIGS. 1 and 2 IN RELATION TO TOTAL GATE AREA Consider the circuit of FIG. 1 in relation to the total gate area required. Assuming all the gate lengths equal, the load transistors, the QR series, will each account for one square unit of area. FIG. 1 has five such transistors QR1, QR2, QR6, QR7 and QR13. Each inverter transistor which is not series connected to another inverter transistor will account for $Z$ square units. Transistors Q1, Q2, Q6, Q7 and Q13 are in the category so their total gate area is $5Z$. If transistors Q11 and Q12 are assumed to be absent, transistors Q8 and Q9 are each in series with transistor Q10, so that all three of them will each require $2Z$ square units of gate area, for a total of $6Z$. There are also the transistors Q3 and Q4 in series with the transistor Q5 for another total area of $6Z$. Adding up the area for the whole circuit gives $17Z+5$. Assuming $Z=9$, the total gate area is 158 square units.

If transistors Q11 and Q12 are included, there are two strings of three inverter transistors in series each of which must have a gate area of $3Z$ ($W$ now equaling 27 units instead of 18), and the total gate area becomes $26Z+5=239$ square units.

The circuit of FIG. 2 is better than FIG. 1 in this respect. It has three load transistors QR1, QR2, QR13 and two transmission transistors Q31 and Q32 which do not need to have such a low resistance as the inverter transistors and can therefore be treated as load resistors from the point of view of calculating the total gate area. These together require five square units. Transistors Q1, Q2, and Q13 require $Z$ square units each and transistors Q25 to Q30 require $3Z$ square units each, since they are arranged in two series strings of three. This give a total gate area of $21Z+5$ or 194 square units. This can be reduced to 104 square units by omitting the *J–K transistors Q27 and Q30, but then only mode d* is possible. Thus the best that the prior art circuits can offer in terms of necessary square units of gate area is 104 with mode *d* operation only, and 194 with all modes of operation.

A comparison of the FIG. 3 circuit will immediately disclose its significant improvement in this regard. It contains a total of nine load and transmission transistors QR33, QR34, QR35, QR36, QR13, QT1, QT2, QT3, and QT4, each of which needs only one square unit of gate area, plus five inverter transistors Q33, Q34, Q35, Q36 and Q13, each requiring $Z$ square units, for a total of $5Z+9$ or 54 square units. It is true that the circuit of FIG. 3 lacks the full capabilities for modes *a* to *c* and in this respect is similar in function to FIG. 1 or 2 without the extra *J–K* transistors, in which respect it nevertheless compares favorably with their total gate areas of 158 and 104 square units, respectively, for mode *d* only. The advantages that flow from a reduced total gate area have been discussed above and it is not proposed to reiterate them here now that it has been demonstrated that the circuit of FIG. 3 does in fact achieve a significant reduction in such total area, without loss of performance.

This improvement is achieved, of course, by the avoidance of series connections of inverter transistors, and especially avoidance of any strings of three such transistors in series.

Figure 6:
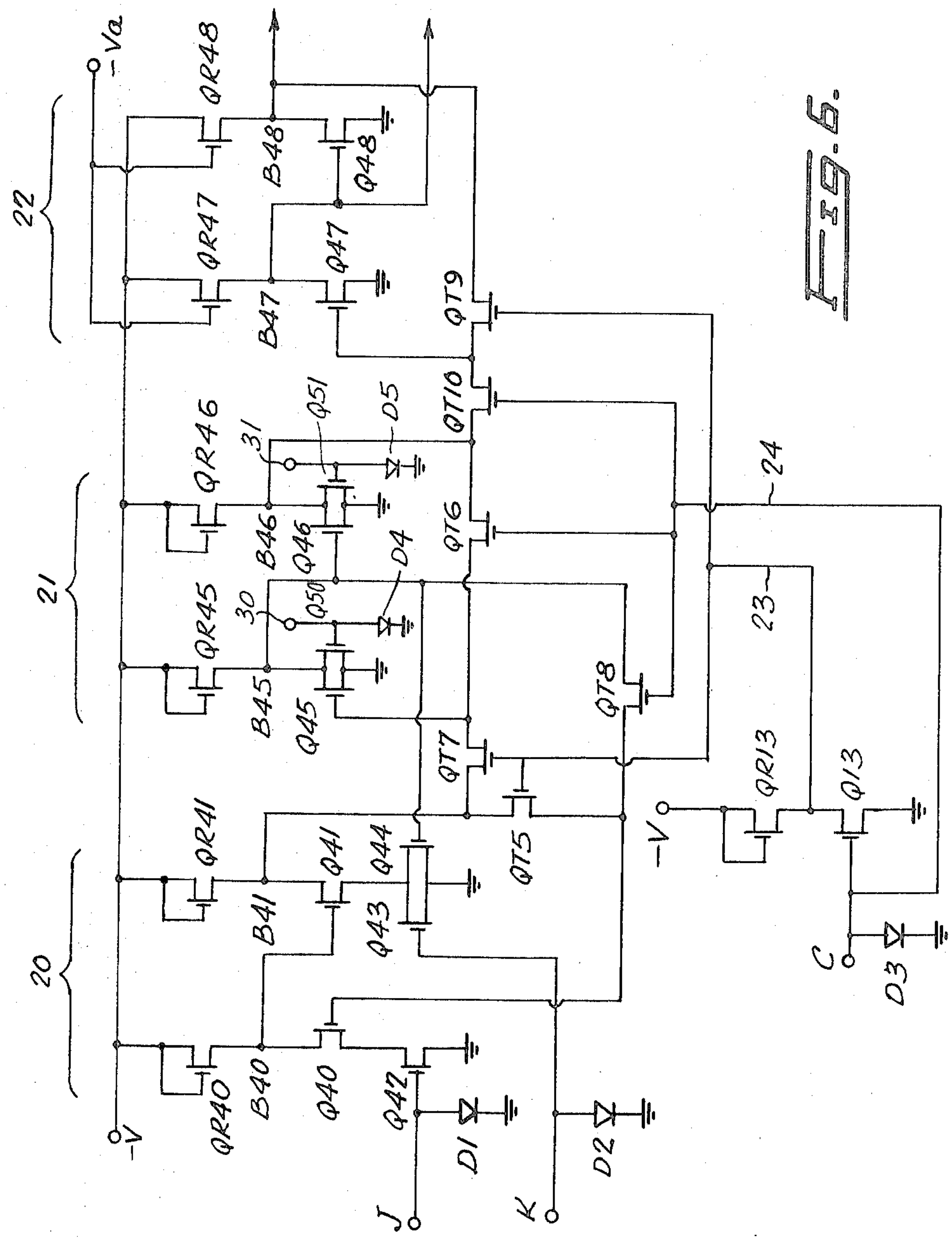
FIG. 6 is a second example of a *J–K* flip-flop circuit according to the invention.
Figure 6A:
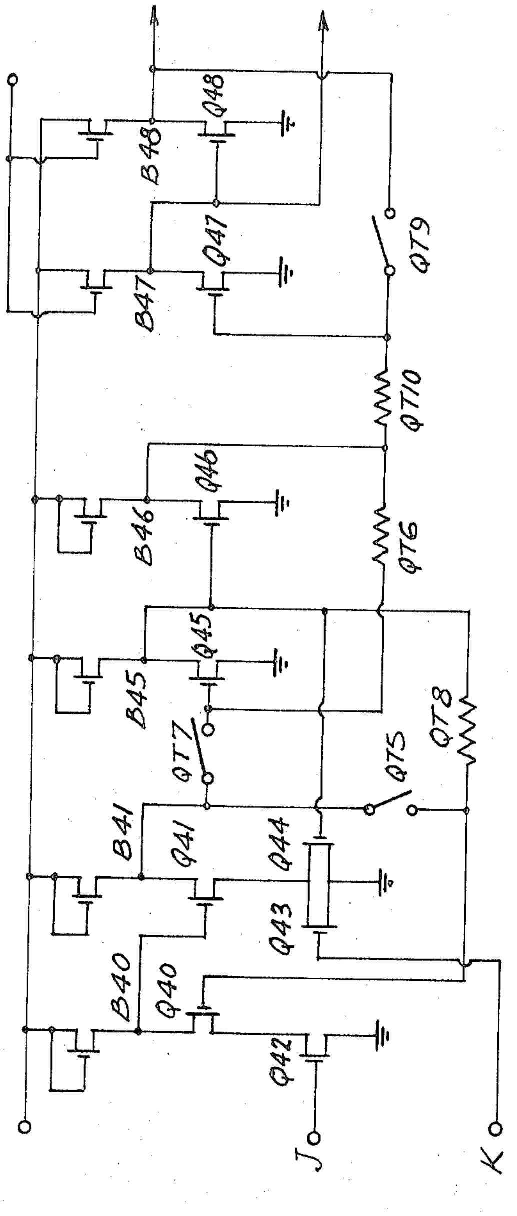
FIG. 6*a* is a partial equivalent circuit of FIG. 6 demonstrating a first circuit condition.
Figure 6B:
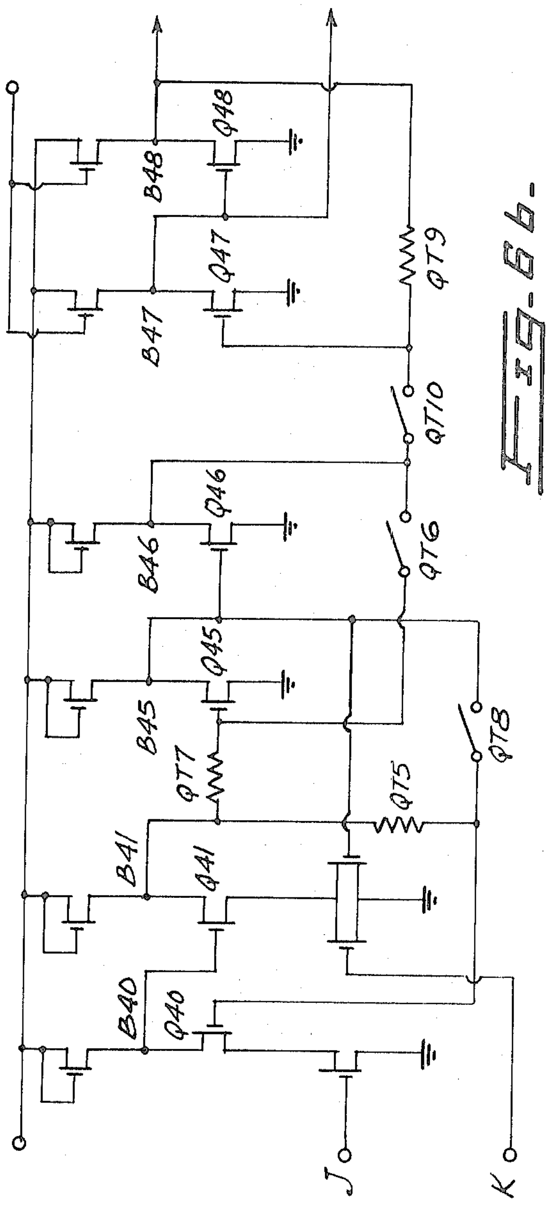
FIG. 6*b* is a partial equivalent circuit of FIG. 6 demonstrating a second circuit condition.

SECOND CIRCUIT ACCORDING TO THE INVENTION (FIGS. 6 to 6*b*)

The second embodiment of the invention comprises a circuit having the full mode capability of a *J–K* flip-flop, i.e. *a* to *d* above, while simultaneously retaining a substantial saving in total gate area. This circuit is shown in FIG. 6 as comprising a logic gate stage 20 consisting of inverter transistors Q40 and Q41 with companion load transistor QR40 and QR41. As in FIG. 3, one feedback path is direct coupled, from point B40 to the gate of transistor Q41. The other feedback path from point B41 to the gate of transistor Q40 passes tnrough a transmission transistor QT5. Inputs $J$ and $K$ are connected to the gates of inverter transistors Q42 and Q43 which are respectively arranged in series with transistors Q40, and Q41. A further transistor Q44 is connected in parallel with transistor Q43.

The next portion of the circuit is a first storage stage 21 comprising inverter transistors Q45 and Q46 with companion load transistors QR45 and QR46. Point B45 is directly cross-coupled to the gate of transistor Q46, while point B46 is connected to the gate of the transistor Q45 only through a further transmission transistor QT6.

Coupling between stages 20 and 21 takes place by means of a connection extending from point B45 to the gate of transistor Q44, and through a further transmission transistor QT7 which connects point B41 to the gate of transistor Q45. There is also another transmission transistor QT8 connected between point B45 and the gate of transistor Q40.

There follows a second storage and output stage 22 having two inverter transistors Q47 and Q48 with companion load transistors QR47 and QR48. The latter differ from the load transistors hitherto described in that their gates are not connected to the source $-V$ but instead to a second source $-Va$. While this circuit can operate when $-V=-Va=-20$ volts or less, it is preferred to choose values of $-V=$ approximately $-17$ volts, and $-Va=$ approximately $-25$ volts, when two voltage supplies are available. This spread between $-V$ and $-Va$ enables the circuit to tolerate large variation of transistor parameters and also enables it to have a higher fan-out capability, as well as a larger noise margin.

Point B47 is directly cross-coupled to the gate of the transistor Q48, while the point B48 is connected to the gate of the transistor Q47 through a transmission transistor QT9. The two storage stages 21 and 22 are coupled through a further transmission transistor QT10 connected between point B46 and the gate of transistor Q47. Points B47 and B48 comprise the output.

A clock pulse circuit similar to that described in each of the foregoing circuits and comprising an input terminal C, inverter transistor Q13, load transistor QR13 and an intermediate point B13, provides two-phase clock pulses on lines 23 and 24. Line 23 extends to the gates of transistors QT5, QT7 and QT9, while line 24 extends to the gates of transistors QT6, QT8 and QT10.

FIG. 6a shows conditions when line 23 is at level 0 and line 24 is at level 1, switching on transistors QT6, QT8 and QT10 and switching off transistors QT5, QT7 and QT9. FIG. 6b shows the reverse condition.

This circuit also makes use of the inherent capacitance feature shown in FIGS. 2 and 3, although not separately illustrated in FIG. 6, in the operation of transistors Q40 and Q45.

OPERATION OF THE CIRCUIT OF FIG. 6

Consider first the FIG. 6a condition, assuming that the *J* and *K* inputs are both at 1 to switch on transistors Q42 and Q43. Assume also that transistor Q40 is OFF, so that point B40 is at 1 holding transistor Q41 ON and point B41 at 0. This condition is stable, since points B45 and B47 are at 0 and points B46 and B48 are at 1.

On the first half of the clock cycle conditions are changed to that of FIG. 6b connecting point B41 which is a 0 to the gate of transistor Q45, through the now ON transistor QT7, and thus switching such transistor Q45 OFF and allowing point B45 to rise to 1. This in turn switches on the transistor Q46 to bring point B46 to 0 and the state of the flip-flop of the first storage stage 21 has been reversed. Put another way, the state of the logic gate 20 has been transferred to the first storage stage 21. The gate of transistor Q40 is now virtually isolated from the output of the first storage stage 21 by the OFF transistor QT8. In reality, even the high resistance of this transistor QT8 when OFF cannot completely isolate the gate of transistor Q40 when the period of the clock pulse is long, but, since transistor QT5 is turned on at this time, to connect the 0 level of point B41 to the gate of transistor Q40, this latter latching action overrides any effect of leakage past the transistor QT8 and holds the flip-flop stable down to very low clock pulse frequencies, i.e. down to DC.

On occurrence of the second half of the clock cycle the condition now stored in the first storage stage 21 is transferred to the second storage stage 22 by means of the transistor QT10 which is now ON (FIG. 6a) and which connects point B46 at level 0 to the gate of transistor Q47 thus to reverse the state of the second storage stage 22.

At the same time transistor QT8 which is now ON connects point B45 which is at 1 to the gate of transistor Q40 to switch it on and reverse the state of the logic gate 20. Thus the logic levels of the points B that have just been described can be summarized in the following table:

| | B40 | B41 | B45 | B46 | B47 | B48 |
|---|---|---|---|---|---|---|
| Initially | 1 | 0 | 0 | 1 | 0 | 1 |
| After first half of clock pulse | 1 | 0 | 1 | 0 | 0 | 1 |
| After second half of clock pulse | 0 | 1 | 1 | 0 | 1 | 0 |

The final state is thus a full reversal of the initial state and the next clock cycle will cause another complete reversal. Thus after $n+1$ complete clock cycles the state of the flip-flop output (point B47 or B48) is always the reverse of its state after $n$ complete cycles, which is the requirement for mode *d*.

To demonstrate that the other modes are also satisfied, assume $J=K=$Transistor Q42 is then always OFF, so that point B40 is always 1, and point B41 always 0. Once this condition has reached the output point B47 and B48 the situation will be as shown in the last line in the table above except that points B40 and B41 will not have been reversed but will have remained at 1 and 0 respectively. Subsequent clock pulses will make no changes of state, so that after $n+1$ cycles the state of the flip-flop output is always the same as its state after $n$ cycles, which is the requirement for mode *a*.

For mode *b*, put $J=1$ and $K=0$, and assume as an initial state that point B40 is 0 and point B41 is 1. Transistors Q40 and Q42 are ON and transistors Q41, Q43 and Q44 are OFF. The first half cycle of the clock pulse (FIG. 6a) connects point B45 at 0 to the gate of transistor Q40 switching it off an bringing point B40 to 1. This action switches on transistor Q41, but both transistors Q43 and Q44 are OFF, so point B41 remains at 1. The second half clock cycle connects point B41 to the gate of transistor Q40 to switch it ON again, so that the point B40 returns to 0. However, point B41 always remains 1, and this condition is transferred to the first and second storage stages to that points B45 and B47 remain always 0 and points B46 and B48 remain always 1. Thus, using point B48 as the output, this is always 1 after $n+1$ cycles, thus satisfying mode *b*.

As to mode *c* when $J=0$ and $K=1$, transistor Q42 is always OFF, so that point B40 is always 1 and point B41 is always 0, and this condition is transferred to the first and second storage states so that points B45 and B7 remain always 1 and points B46 and B48 remain always 0. Thus, using point B48 as the output, this is always 0 after $n+1$ cycles, thus satisfying mode *c*.

SET AND RESET IN FIG. 6

This circuit also has a SET input terminal 30 and a RESET input terminal 31, these terminals being respectively connected to the gates of transistors Q50 and Q51, the current electrodes of which are connected in parallel with those of transistors Q45 and Q46, respectively, of stage 21. An input at either of the terminals 30, 31 will override the input received from the previous stage 20, but the resulting setting of stage 21 in whichever sense is demanded will not be passed on the output stage 22 until the next clock pulse turns ON the transmission transistor.

It can thus be seen that stages 20 and 21 perform essentially the same function as stages S' and M' in FIG. 3, while the third stage 22 serves to ensure that any changeover in output is always coincident with a clock pulse, even though a SET or RESET pulse may be received between clock pulses.

STRUCTURAL CONSIDERATIONS FOR THE CIRCUIT OF FIG. 6 IN RELATION TO TOTAL GATE AREA

Applying the considerations developed above in relation to the total gate area to FIG. 6, it will be found to have a total of seven load transistors QR40, QR41, QR45, QR46, QR47, QR48 and QR13 and a total of six transmission transistors QT5 to QT10. This a total of relatively high resistance transistors each requiring one square unit of gate area. There are five inverter transistors not series-connected with another inverter transistor, namely Q45 to Q48 and Q13 for a total gate area of 5Z. There are five inverter transistors in series with each other and therefore each requiring 2Z gate area, namely transistors Q40 and Q44, for a total of 10Z. The total for the whole circuit is thus 15Z +13 or 148 square units, which compares favorably with the 239 square units needed in the FIG. 1 circuit when operating with full mode capability and with the 194 square units needed under the same conditions by the FIG. 2 circuit.

BASIC DIFFERENCES BETWEEN THE CIRCUITS ACCORDING TO THE INVENTION (FIGS. 3 AND 6) AND THE PRIOR ART CIRCUITS (FIGS. 1 AND 2)

It is believed to have been amply demonstrated that the FIG. 3 and 6 circuits have a significant advantage over the prior art circuits in terms of reduced total gate area, and that this advantage has improved manufacturing consequences.

It is intended to explore now the circuit features that give rise to this reduced total gate area. It stems, of course, in the main, from avoidance or minimization of series-connected inverter (low resistance) transistors. In FIG. 3, series connection of inverter transistors is entirely avoided. In FIG. 6 it is only minimized. However, any series connection of three inverter transistors in a string, which type of connections is characteristic of the circuits of FIGS. 1 an 2 when operating with full mode capability, is entirely avoided in FIG. 6.

The basic circuit difference which enables the avoidance of strings of two inverter transistors in mode *d* only circuits and the avoidance of strings of three inverter transistors in full mode circuits, resides in the concept of passing one of the cross-coupling feedback connections of each flip-flop assembly through a transmission transistor that is gated by the clock pulses, instead of making the connection direct as the FIG. 1 and 2 circuits do and therefore need to have the additional series connected transistors for control functions. For example, in contrast to FIGS. 1 and 2 where points B1, B2, B6 and B7 are directly connected to the gate of the opposite inverter transistor, in FIGS. 3 and 6 points B34, B36, B41, B46 and B48 are connected to the opposite transistor gate only through respective transmission transistors QT4, QT3, QT5 QT6 and QT9 which are controlled by the clock pulses.

MISCELLANEOUS ADDITIONAL POINTS

In practical production the circuit of FIG. 6 can usefully be augmented by the provision of a driver stage connected to the output points B47, B48 for enhancing the output capability of the circuit. Since such arrangement will in itself be conventional it has been omitted from the circuit diagrams.

Diodes D1 to D5 (FIG. 6) may be incorporated, shunting to ground the input gates of transistors Q42, Q43, Q13, Q50 and Q51 respectively, for protecting the thin gate oxide of these transistors from damage due to high electrostatic voltage build up on their metal gates. These diodes will consist of P-diffused islands of minimum surface geometry on the N-type substrate and are formed during the same P-diffusion step as the transistor current electrodes, so that no extra process step is required. Of course N islands on P-type substrate can be used, with appropriate changes of sign of the applied voltages.

I claim:

1. An integrated circuit of enhancement-type MOS transistors comprising two flip-flop stages interconnected to provide *J–K* capability, wherein:

a. each said stage comprises a pair of series circuits for retaining binary logic levels;

b. each said series circuit comprises a first enhancement-type MOS transistor to act as an inverter, and a second enhancement-type MOS transistor of the same channel-type as the first transistor to act as a load connected in series with said inverter transistor, the resistance of said second transistor being higher than that of said first transistor, said integrated circuit further comprising:

c. means in each stage directly connecting a first other series circuit of the other of said stages to the gate of the inverter transistor of said first series circuit of said other stage, including means interconnecting said stages, said interconnecting means comprising:

f. means including an enhancement-type MOS transistor to act as a third transmission transistor connecting said second common point of said first stage to the gate of the inverter transistor of said first series circuit of said other stage through said third transmission transistor;

g. means including an enhancement-type MOS transistor to act as a fourth transmission transistor connecting said first common point of said other stage to the gate of the inverter transistor of said first series circuit of said first stage through said fourth transmission transistor; and h. means for applying clock pulses to the gates of said transmission transistors, comprising means for applying one phase of a two phase clock pulse simultaneously to said first and third transmission transistors and the other phase of said two phase clock pulse simultaneously to said second and fourth transmission transistors.

2. An integrated circuit according to claim 1 including:

j. two further enhancement-type MOS transistors each connected in series with the inverter transistor of a respective one of the series circuits of one of said stages; and k. means connecting the gates of said further transistors to respective terminals for receiving *J* and *K* inputs.

3. An integrated circuit of enhancement-type MOS transistors comprising:

a. three flip-flop stages interconnected to provide *J–K* capability;

b. each said stage comprising a pair of series circuits for retaining binary logic levels;

c. each said series circuit comprising a first enhancement-type MOS transistor to act as an inverter, and a second enhancement-type MOS transistor to act as a load connected in series with said inverter transistor, the resistance of said second transistor being higher than that of said first transistor;

d. means directly connecting the common point between the transistors of a first of said series circuits in each of said stages to the gate of the inverter transistor of the other series circuit of the same stage;

e. means including an enhancement-type MOS transistor to act as a feedback transmission transistor connecting the common point between the transistors of said other series circuit in each of said stages to the gate of the inverter transistor of the first series circuit of the same stage through said transmission transistor;

f. interstage connecting means including:

i. a fourth, enhancement-type MOS transistor to act as a transmission transistor connecting a common point between the transistors of said other series circuit of a first of said stages to the gate of the inverter transistor of the first series circuit of a second of said stages through said fourth transistor, ii. a fifth, enhancement-type MOS transistor to act as a transmission transistor connecting a common point between the transistors of said other series circuit of the second stage to the gate of the inverter transistor of the first series circuit of the third stage through said fifth transistor, iii. a sixth, enhancement-type MOS transistor to act as a transmission transistor connecting a common point between the transistors of the first series circuit of the second stage to the gate of the inverter transistor of said first series circuit of the first stage; and g. means for applying clock pulses to the gates of said transmission transistors for establishing transmission alternately;

iv. through the feedback transmission transistors of the first and third stages and through said fourth transistor while preventing transmission through the remaining transmission transistors, and v. through the feedback transmission transistor of the second stage and through said fifth and sixth transistors while preventing transmission through the remaining transmission transistors.

4. An integrated circuit according to claim 3, including two further enhancement-type MOS transistors each connected in parallel with a respective one of the inverter transistors of said second stage, and set and reset input terminals each connected to the gate of a respective one of said further transistors.

5. An integrated circuit according to claim 4, including two still further enhancement-type MOS transistors each connected in series with the inverter transistor of a respective one of the series circuits of said first stage, and means connecting the gates of said still further transistors to respective terminals for receiving *J* and *K* inputs.